(12) United States Patent
Kilgore (10) Patent No.: US 7,676,837 B2
(45) Date of Patent: Mar. 9, 2010

(54) FIREWALL PROTECTION FOR WIRELESS USERS

(75) Inventor: Brian Kilgore, Melbourne, FL (US)

(73) Assignee: IPR Licensing, Inc., Wilmington, DE (US)

( * ) Notice: Subject to any disclaimer, the term of this patent is extended or adjusted under 35 U.S.C. 154(b) by 318 days.

(21) Appl. No.: 11/498,588

(22) Filed: Aug. 3, 2006

(65) Prior Publication Data

US 2006/0272013 A1 Nov. 30, 2006

Related U.S. Application Data

(63) Continuation of application No. 09/847,865, filed on May 2, 2001, now Pat. No. 7,089,586.

(51) Int. Cl.
G06F 17/00 (2006.01)
G06F 17/30 (2006.01)
(52) U.S. Cl. ................. 726/13; 726/11; 726/3
(58) Field of Classification Search ............... 726/13, 726/11, 3
See application file for complete search history.

(56) References Cited

U.S. PATENT DOCUMENTS

| 5,673,322 | A | 9/1997 | Pepe et al. |
| 5,758,088 | A | 5/1998 | Bezaire et al. |
| 6,061,346 | A | 5/2000 | Nordman |
| 6,161,125 | A | 12/2000 | Traversat et al. |

OTHER PUBLICATIONS

User Security Behavior on Wireless Networks: An Empirical Study; Chenoweth, T.; Minch, R.; Tabor, S.; System Sciences, 2007. HICSS 2007. 40th Annual Hawaii International Conference on Jan. 2007 pp. 145b-145b.*
Securing Ad Hoc Wireless Networks Against Data Injection Attacks Using Firewalls; Jun Cheol Park; Sneha Kumar Kasera; Wireless Communications and Networking Conference, 2007.WCNC 2007. IEEE Mar. 11-15, 2007 pp. 2843-2848.*
Firewalls for security in wireless networks;Murthy, U. Bukhres, O. Winn, W. Vanderdez, E.; Proceedings of the Thirty-First Hawaii International Conference on; Publication Date: Jan. 6-9, 1998; vol. 7; pp. 672-680 vol. 7 Jan. 6-9, 1998.*

(Continued)

Primary Examiner—David Y Jung
(74) Attorney, Agent, or Firm—Volpe and Koenig PC (57) ABSTRACT

In a computer telecommunications network, firewalls protect a machine or network from undesired message transmissions. In the case of a firewall employed on a user side of the wireless link, a message rejected by the firewall has already consumed the wireless resources required to transmit. A system for protecting a mobile wireless user via a firewall employed at the wired line, or ISP side, of the wireless link in a wireless network allows a specific user profile to be provided for each user that is indicative of a desired firewall configuration corresponding to the mobile user. A firewall configuration is established at a firewall application in a wireless transceiver corresponding to the current location of the mobile user, and the same firewall configuration is established, via a wireless handoff, at a second wireless transceiver when the user is located in the area corresponding to the second wireless transceiver, thereby protecting a plurality of wireless users prior to wasteful wireless transmission of undesired messages.

10 Claims, 7 Drawing Sheets

OTHER PUBLICATIONS

Combating TCP Based Attacks on Mobile Devices; Njogu, H.W.; Xiehua Li; Computer Science and Software Engineering, 2008 International Conference on vol. 3, Dec. 12-14, 2008 pp. 1113-1118.*
"Nokia A020 Wireless LAN Access Point for Enterprises," Jul. 20, 2000.
"Nokia A021 Wireless LAN Access Point for Offices and Homes," Jul. 20, 2000.
http://www.nokia.com/corporate/wlan/point_a021.html, Jul. 20, 2000.
"Nokia A032 Wireless LAN Access Point Secure and fast wireless LAN access," Jul. 20, 2000.
http://www.nokia.com/corporate/wlan/point_a032.html, Sep. 14, 2000.
http://www.nokia.com/corporate/wlan/point_a020.html, Jul. 20, 2000.
Airport "Wireless Networking a Technical Overview," May 2000.
http://www.sustworks.com/site/ipr_guide/firewall.html, Jul. 17, 2000.
http://www-cad.eecs.berkeley.edu/~mds/classes/cs261/writeup.html, Jul. 17, 2000.
Phifer, L., "The Trouble with NAT", *The Internet Protocol Journal*, Cisco Systems Incorporated, pp. 1-15 (Dec. 2000).

Nokia, "Wireless LAN Access Point Advanced User Guide", *Nokia A032 Advanced User Guide*, Nokia Corporation, pp. 1-212 (2000).
"Nokia A032," Jul. 20, 2000, available at http://www.nokia.com/corporate/wlan/point_a020.html.
Newton's Telecom Dictionary, Eighth Edition, Flatiron Publishing, 1994.
Chapman, B.D., Cooper, S., Zwicky, E.D., "Building Internet Firewalls, $2^{nd}$ Edition," O'Reilly, Jun. 2000.
Lee, W.C., "Mobile Communications Design Fundamentals," John Wiley & Co., 1993.
Sorenson, D., "AirPort Wireless Networking: Part I", Nov. 23, 1999, pp. 1-13.
Yamada, T., et al., A secured microcellular network supported by system-VLSI; TENCON 2004, IEEE Region 10 Conference, vol. B, Nov. 21-24, 2004, pp. 569-572, vol. 2.
Dillinger, M., et al., Decentralized software distribution for SDR terminals; Wireless Communications, IEEE, vol. 9, Issue 2, Apr. 2002, pp. 20-25.
Salem, N.B., et al., "Node Cooperation in Hybrid Ad Hoc Networks", IEEE Transactions on Mobile Computing, vol. 5, Issue 4, Jul.-Aug. 2006, pp. 365-376.

* cited by examiner

USER PROFILE TABLE

| Subscriber/User ID | Port Number | Application ID | Source IP Address | Destination IP Address | Direction | TCP/IP Flags | Allow/Restrict | Intrusion Detection |
|---|---|---|---|---|---|---|---|---|
| 14a | 7070 | * | * | 100.50.3.3 | * | * | A | Y |
| 14b | * | * | 127.0.0.0 | * | * | * | R | N |
| 14b | * | * | 127.104.0.19 | * | * | * | A | N |
| 14c | * | * | * | 192.178.16.1 | * | * | R | Y |

FIREWALL PROTECTION FOR WIRELESS USERS

RELATED APPLICATION

This application is a continuation of U.S. application Ser. No. 09/847,865, filed May 2, 2001 now U.S. Pat. No. 7,089,586. The entire teachings of the above application are incorporated herein by reference.

BACKGROUND OF THE INVENTION

In a computer telecommunications network, firewalls are known which are used to protect a machine or network from undesired message transmissions. Undesired messages can burden resources such as processing and storage, can affect timely processing of other tasks, and may also be the result of malicious activity by hackers, causing more serious effects such as those caused by viruses, Trojan horses, and worms.

A firewall is typically located at a point of entry into a computer system or network, such as a port or TCP/IP network interface, and scans incoming message traffic by comparing the message traffic to a predetermined criteria. Message traffic matching not matching the predetermined criteria is discarded as undesired.

The criteria employed by a firewall to match and determine whether to accept or reject message traffic typically include parameters such as port numbers, application IDs, source, destination, content filters, IP address, machine names, and TCP/IP flags, and can potentially include many others depending on the complexity to be tolerated and the degree of protection desired. The number of parameters to be matched in determining whether to accept or reject message traffic determines a granularity of protection. Therefore, a firewall having a low granularity of criteria may inadvertently block desired incoming message traffic as undesired, and may not be adequate to protect against some undesired traffic.

Further, telecommunications networks may comprise wired and wireless links. A wireless link is typically provided between a base station processor and a subscriber access unit which exchange messages according to a wireless protocol such as IS_95 or other proprietary wireless protocol. The subscriber access unit is connected to the user computer system or network, and the base station processor is connected to a public access network such as the Internet. In a typical wireless link, a firewall is employed in the subscriber access unit, or in a subsequent gateway into the machine or network to be protected. Alternatively, the firewall may be employed in the computer system defining the access point to the network on the user side of the wireless link.

The wireless link, however, is supported by RF channels, which are a scarce resource that is allocated among many connections supported over the wireless link. Since the firewall is employed on the user side of the wireless link, a message rejected by the firewall has already consumed the wireless resources required to transmit. Accordingly, messages rejected by the firewall tend to waste bandwidth which could be allocated to other connections, can drive up user cost by increasing message transmissions, and tend to slow overall throughput because of the resources required to transmit them over the wireless link.

In other systems, the firewall may be employed on the wired network side of the wireless link, thereby detecting undesired transmissions prior to transmission from the base station processor or other wireless transceiver in communication with the subscriber access unit. However, a typical base station processor typically supports many subscriber access units corresponding to many different users. Therefore, locating the firewall on the base station processor side of the firewall removes wireless burden, but forces all users to conform to the same firewall.

However, different users may wish to protect a network or system according to varying degrees of granularity. One user may wish to reject all transmissions from a particular TCP/IP network address, and another may not. Or a particular user may wish to accept traffic only from a particular subnet address of a network, while another user may wish to accept all transmissions from the network address. Still other users may wish to accept message traffic only destined for a particular port, or application, while others may wish to block incoming connections altogether, and allow only outgoing connections. Various permutations of user granularity may be desired by different users.

Accordingly, it would be beneficial to provide a system and method for protecting a mobile wireless user via a firewall in a wireless network to allows a specific user profile to be provided for each user indicative of a desired firewall configuration corresponding to the mobile user.

SUMMARY OF THE INVENTION

In a wireless communication network, a mobile user may be served by more than one wireless transceiver as the mobile user travels from one wireless sector to another wireless sector. A method and system for protecting a mobile wireless user via a firewall employed at the wired line, or ISP side, of the wireless link in a wireless network allows a specific user profile to be provided for each user that is indicative of a desired firewall configuration corresponding to the mobile user. A wireless subscriber access unit corresponding to the mobile user is operable for wireless communication with the wireless transceiver. A firewall configuration is established at a firewall application in the wireless transceiver corresponding to the current location of the mobile user, and the same firewall configuration is established, via a wireless handoff, at a second wireless transceiver when the user is located in the area corresponding to the second wireless transceiver.

In the wireless network, each mobile user initially signs on with a wireless transceiver, such as a base station processor, corresponding to the area in which the user is located. The base station processor accesses a central repository, such as a Wireless Internet Facility (WIF), operable to store a mobile user profile indicative of desired firewall configuration corresponding to the particular mobile user, and may also indicate other transmission parameters to be applied to wireless communications with the particular mobile user. A unique identifier corresponding to the mobile user is invoked to lookup the mobile user profile. The unique identifier may be an electronic serial number (ESN), a subscriber ID, or other identifier adapted to identify the mobile user. The WIF transmits the mobile user profile corresponding to the mobile user, and the base station processor establishes the desired firewall configuration for the particular mobile user. As the same base station processor may serve many mobile users, a plurality of desired firewall configurations are likely to be active, each corresponding to a particular one of the mobile users.

As the mobile user moves, an area corresponding to another base station processor may be entered, thereby triggering a wireless handoff from the first base station to the second. The second base station receives the mobile use profile from the WIF employing the unique identifier, and receives the corresponding mobile user profile. The second base station processor then establishes the same firewall configuration as the mobile user travels into the area corresponding to the second base station processor.

Further, as the base station processor is providing the desired firewall configuration, rather than the subscriber access unit on an opposed side of the wireless link, the wireless link is not burdened with transmissions which are blocked by the firewall. In this manner, a user will not be charged with transmissions which would be ultimately discarded by the firewall, and the base station processor is not burdened with allocating bandwidth to undesired transmissions.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present application describes a system and method for establishing a firewall configuration corresponding to a mobile wireless user which continues to provide consistent firewall protection between different subscriber access units as the user moves from an area served by one wireless transceiver, such as a base station processor, into an area served by another base station processor, wherein the firewall configuration may be different from that of another mobile wireless user.

Figure 1:
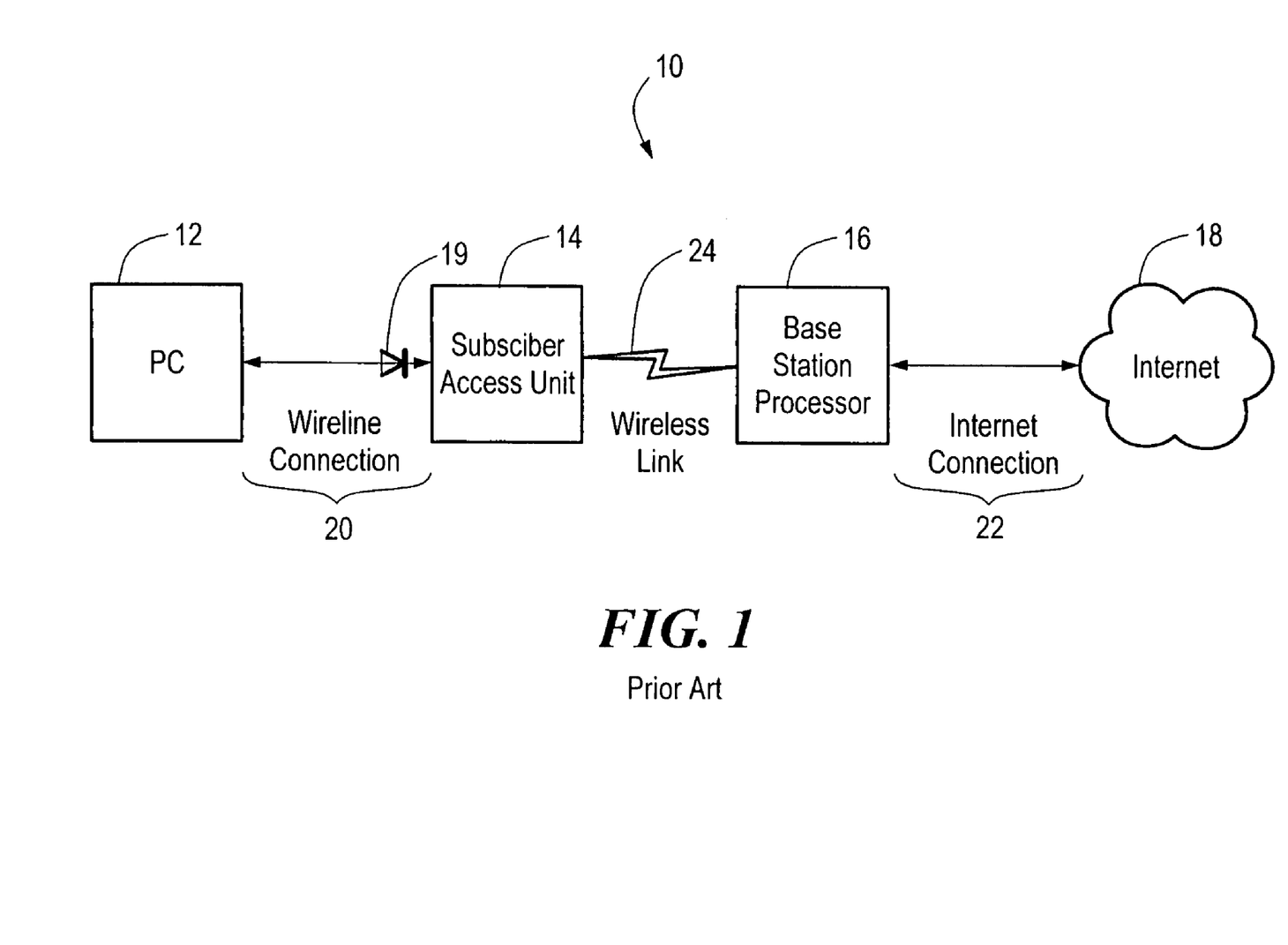
FIG. 1 shows a block diagram of a prior art firewall implementation in a communications network.

FIG. 1 shows a typical prior art firewall in a wireless communication system having a wireless link. Referring to FIG. 1, a prior art communication system 10 is shown. A user PC 12 or other access point into a user computer system or local area network is in communication with a subscriber access unit 14 via a wireline connection 20. The wireline connection 20 may be any suitable wired medium such as TCP/IP, Ethernet, or direct connection. The subscriber access unit 14 is in communication with a wireless transceiver, such as the base station processor 16, via a wireless link 24, and is operable to transmit wireless messages in an RF medium between the subscriber access unit 14 and the base station processor 16. The base station processor 16 is connected to the Internet 18 or other public access network via the Internet connection 22. The Internet connection 22 may also be any suitable wired line connection, such as TCP/IP, UDP/IP, Ethernet, T1 line, POTS (plain old telephone system) or other wired medium. A firewall 19 is located on the wireline connection 20 between the user PC 12 and subscriber access unit 14, and protects the PC 12 against undesired messages which are sent across the wireless link 24, as shown by the orientation of the firewall 19 symbol. Note that the drawing shows the firewall 19 physically drawn between the PC 12 and the subscriber access unit 14 for exemplary purposes only, illustrating the logical link between the reception of the wireless transmissions and the entry point into the user network denoted by the user PC 12. Actual implementations would likely implement the firewall 19 inside either the subscriber access unit 14 or the PC 12. The positioning of the firewall 19 indicates the logical orientation in that it protects undesired message traffic from traveling from the subscriber access unit 14 to the entry point of the user computer system or local area network, denoted here as user PC 12.

In the system shown in prior art FIG. 1, the message traffic is sent over the wireless link 24 to the subscriber access unit 14 before it reaches the firewall 19. Therefore, undesired messages have already consumed wireless resources at the point that they are determined to be undesirable. In the case of a user that may be charged a fee for individual message transmission, charges would accrue for the undesired messages. Even if the user is not charged per message, such transmissions nonetheless consume wireless resources, such as wireless channels, for undesired transmissions, in the base station processor 16, compromising the resources available to all users 12 who may also be served by the same base station processor.

Figure 2:
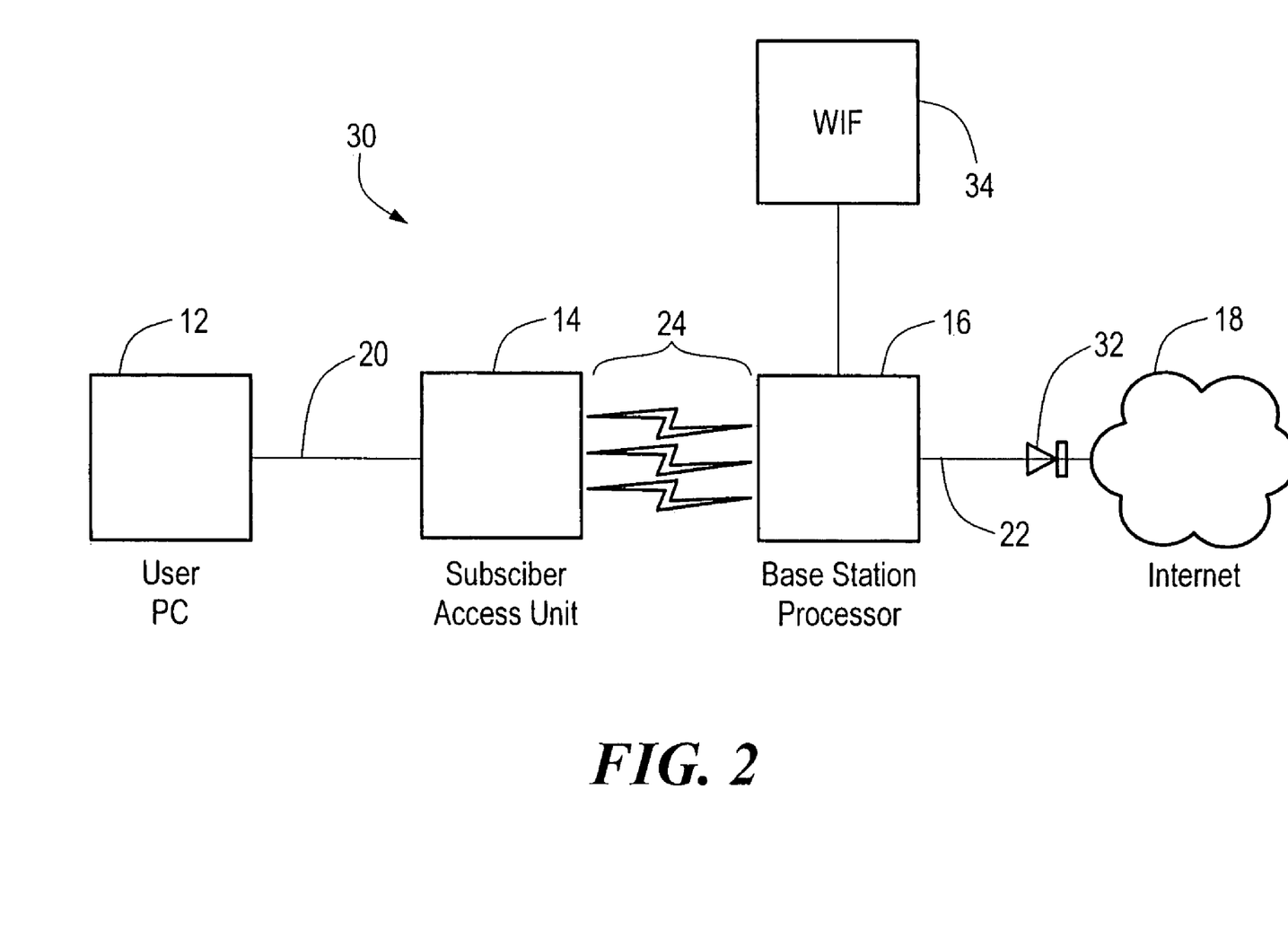
FIG. 2 shows a block diagram of a system operable for firewall protection for wireless users as defined herein.

FIG. 2 shows a block diagram of a system operable for firewall protection for wireless users as defined herein. Referring to FIG. 2, the configurable firewall system 30 is operable for wireless communication between a user PC 12 and the Internet 18 via wired 20, 22 and wireless 24 links between a subscriber access unit 14 and a base station processor 16. A firewall application 32 is located between the base station processor 16 and the Internet 18. Note that the location of the firewall application 32 denotes a logical point between the Internet and access to the wireless network served by the base station processor. Such a firewall application may actually execute in the base station processor 16 or in an Internet gateway (not shown) between the base station processor and the Internet 18, provided that the firewall application is located between the wireless connection 24 to the subscriber access units 14 and the Internet connection.

In such a wireless communication network, each base station processor 16 typically serves many subscriber access units 14a . . . 14n, generally, as will be described further below. The wireless connection 24 includes a plurality of wireless channels, which further comprise a plurality of wireless connections, each connection to a particular subscriber access unit 14. Further, a subscriber access unit 14 may have multiple connections to the base station processor 16. Since the firewall application 32 is protecting the network at a point prior to the connections to each of the subscriber access units 14, the firewall application may establish a firewall configuration specific to each of the subscriber access units. The firewall configuration is determined from a mobile user profile, which is indicative of a set of firewall characteristics desired by the particular subscriber access unit 14. The mobile user profile is stored at a central repository such as a wireless Internet facility 34, and is downloaded to the base station processor 16 for each subscriber access unit 14 as the subscriber access unit 14 signs on or enters the cell served by the base station processor 16. Accordingly, each subscriber access unit is provided firewall protection by the firewall application 32 according to a specific mobile user profile before undesired transmissions have consumed wireless resources, or channels, to transmit the undesired transmissions over the wireless link 24. Further, since the mobile user profile is stored at the WIF 34, it follows the user through a handoff from cell to cell, described further below, since it may be downloaded from the WIF by other base stations serving adjacent cells.

Figure 3:
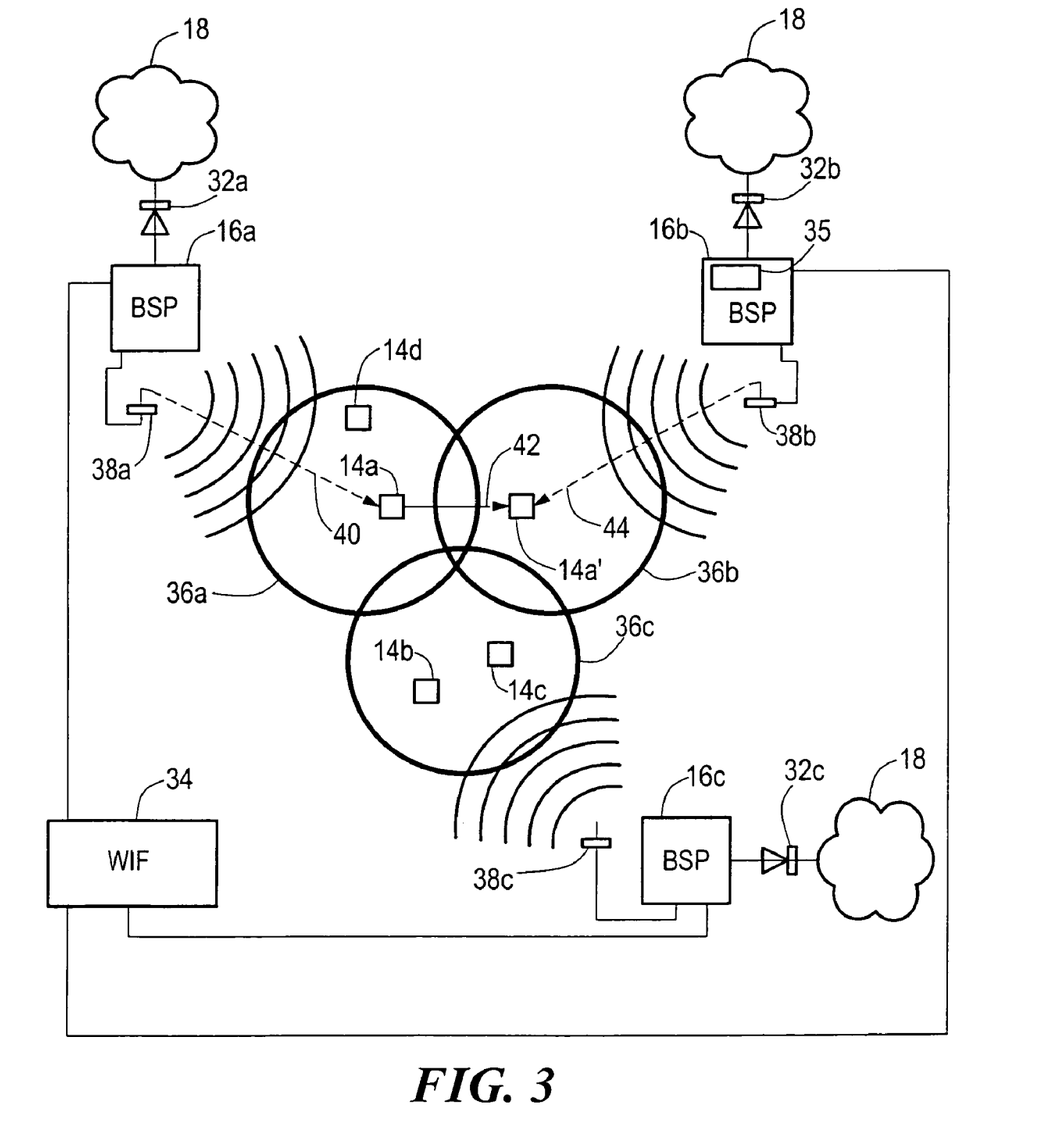
FIG. 3 shows a handoff of a wireless user from one base station to another.

FIG. 3 shows a handoff of a wireless user from one base station to another. Referring to FIG. 3, three cells 36a, 36b, and 36c, are served by base stations 16a, 16b, and 16c, respectively, via antennas 38a, 38b, 38c. Four subscriber access units 14a-14d are also shown in their respective cells. Subscriber access unit 14a is located in cell 36a, and is powered on, receiving wireless signals from base station processor 16a, as shown by dotted line arrow 40. The base station processor 16a receives the mobile user profile corresponding to subscriber 14a, from a user profile table in the WIF 34, described further below with respect to FIG. 4. The base station processor 16a establishes a firewall configuration indicative of the firewall characteristics in the mobile user profile in the firewall application 32a. Such firewall characteristics may include, for example, port numbers, application IDs, source, destination, content filters, IP address, and TCP/IP flags. Other characteristics may be employed depending on the level of protection and the complexity desired by the subscriber access unit 14a.

Subsequently, the subscriber access unit 14a moves into cell 36b, at position 14a', as shown by arrow 42. The base station processor 16b receives the same mobile user profile corresponding to subscriber 14a from the WIF 34. A handoff manager 35 in the base station processor 16b then establishes the firewall configuration indicative of the firewall characteristics in the firewall application 32b. In this manner, a subscriber access unit 14a is provided a consistent firewall configuration according to the mobile user profile as the subscriber 14a moves from cell to cell.

Figure 4A:
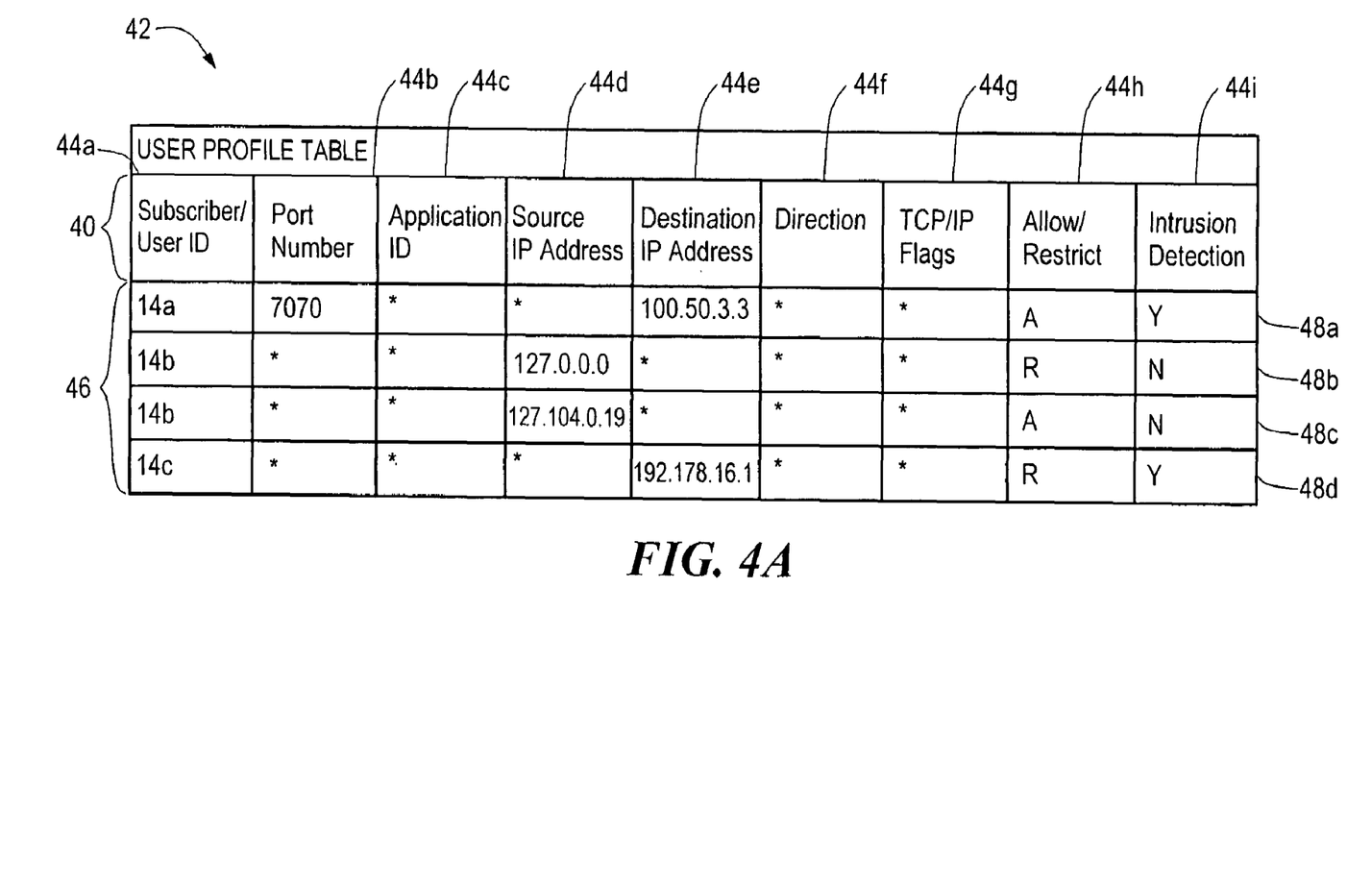
FIG. 4a shows a user profile table stored at a Wireless Internet Facility.

FIG. 4a shows the user profile table stored at a Wireless Internet Facility. Referring to FIG. 4a, the firewall characteristics 40 which may be stored according to a user are shown. The user profile table 42 stores user profile entries 46 corresponding to the subscriber access units 14. Each subscriber access unit 14 has one or more entries 46 in the user profile table 42. A subscriber ID is shown in column 44a, and identifies the particular subscriber to which this entry 46 applies. The aggregate set of entries 46 corresponding to the mobile user profile for a particular user define the firewall configuration for this particular subscriber access unit. Four entries 46 are shown as exemplary; it is expected that multiple entries 46 would be employed for each of many subscriber access units 14. Alternative arrangements of tables may be employed, as long as the tables associate a particular subscriber access unit with a set of firewall characteristics.

For each user profile entry 46, values for applicable firewall characteristics 40 are shown, including whether matching message traffic is to be allowed or restricted 44h. For each characteristic 40, a value is provided. The characteristics shown are consistent with the TCP/IP protocol employed on the Internet, and include port number 44b to which the message is directed; application ID 44c of the message; source IP address of the message 44d; destination IP address 44e to which the message is directed; direction 44f, indicating incoming or outgoing message traffic; and TCP/IP flags 44g employed for control, such as SYN (synchronize) and FIN (finish) bits. An intrusion detection field 44i, described further below, indicates whether further firewall processing will be performed, also described further below with respect to FIG. 4b. Other characteristics can be employed in accordance with the particular protection desired.

For example, user profile entry 48b, corresponding to subscriber access unit 14b, indicates that message traffic from a source IP address 44d of 127.0.0.0 is to be restricted, thus blocking the entire 127.0.0.0 network. However, entry 48c, also corresponding to subscriber access unit 14b, indicates that message traffic from source IP address 44d 127.104.0.19 is to be allowed, thus restricting a broad range of users with the exception of one particular source address.

Figure 5:
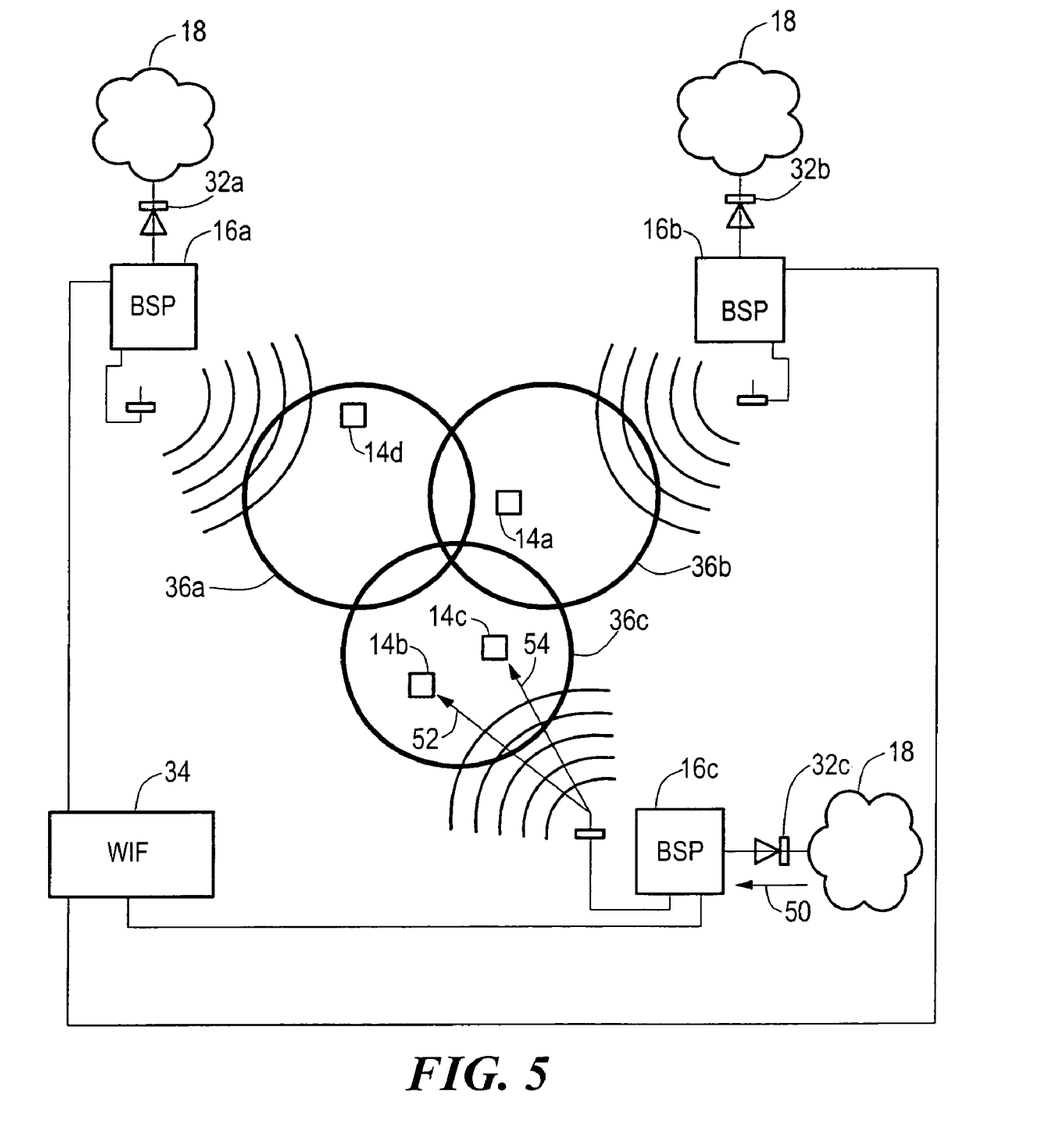
FIG. 5 shows an example of a firewall user profile employed for selective packet transmission among multiple users in the same cell.

FIG. 5 shows an example of the firewall user profile of FIG. 4a employed for selective packet transmission among multiple users in the same cell. Referring to FIGS. 4a and 5, subscriber access units 14b and 14c are both in the cell 36c. Messages destined for both subscribers 14b and 14c are sent from the Internet 18, as shown by arrow 50. Subscriber access unit 14b however, receives only messages corresponding to its firewall configuration as represented by the user profile entries 48b and 48c, as shown by arrow 52. Similarly, subscriber access unit 14c receives only messages corresponding to its firewall configuration as represented by the user profile entry 48d, as shown by arrow 54. Accordingly, the firewall application 32c enforces a user specific firewall configuration for each of the subscriber access units 14b and 14c according to a particular mobile user profile as defined in the user profile table 42.

In the embodiment shown in FIG. 4a, firewall protection is carried out in a stateless manner. A stateless manner is a protection scheme which examines each packet atomically, and does not look to any information in previous packets. In other words, no state is maintained about information which may be obtained by a sequence of packets considered as a whole. Each packet is considered individually, and acceptance or rejection of the packet determined by information in the packet alone.

A state oriented, or statefull, manner of firewall protection considers not only the information contained in the current packet, but also the information in previous packets in conjunction with the current packet. In other words, a group of packets may be indicative of undesired message traffic even though any single packet in the group, when considered alone, is not necessarily undesired. A statefull manner of firewall protection maintains a series of states according to a predetermined set of rules. As packets are received, certain packets may indicate a trend toward various types of message traffic. The state is adjusted, according to the predetermined set of rules, as additional packets are received. Certain states define an indication of undesired message traffic. When such states are attained, firewall protection is then invoked.

The predetermined set of rules which define the states are oriented towards a particular type of undesired message traffic. Typically, a protected entity will invoke multiple sets of rules, each to protect against a particular type of undesired message traffic. Also, there may be multiple sets of rules directed towards the same general type of undesired message traffic, each with varying degrees of specificity and/or granularity with which the rules scrutinize traffic. A high granularity or specificity may unintentionally block desired message traffic, while a low granularity or specificity may inadvertently allow unintended message traffic.

As indicated above, there may be multiple sets of rules, each directed towards particular types of undesired message traffic. Such unintended types include denial of service, password cracking, port scanning, virus detection, content filters, and others which are known in firewall protection schemes, often collectively referred to as intrusion detection schemes. For example, a denial of service set of rules may examine a set of packets looking for repetitive attempts to open a connection on the same port, but without closing, thereby consuming resources available to other users. A port scan set of rules looks for a port scan attack, which is an attempt to open every available port on a node. Similarly, a password cracking set of rules would look for repetitive patterns in passwords, such as incremental passwords directed to the same port, or the same password iteratively applied to a sequence of ports. A content filters set of rules is employed to filter messages based on subjective data contained therein. Various embodiments employing alternative sets of rules may be employed, such as those disclosed in Cheswick, et al., *Firewalls and Internet Security: Repelling the Wily Hacker*, Addison-Wesley Publishing Company, © 1994 AT&T Bell Laboratories, Inc., incorporated herein by reference.

Figure 4B:
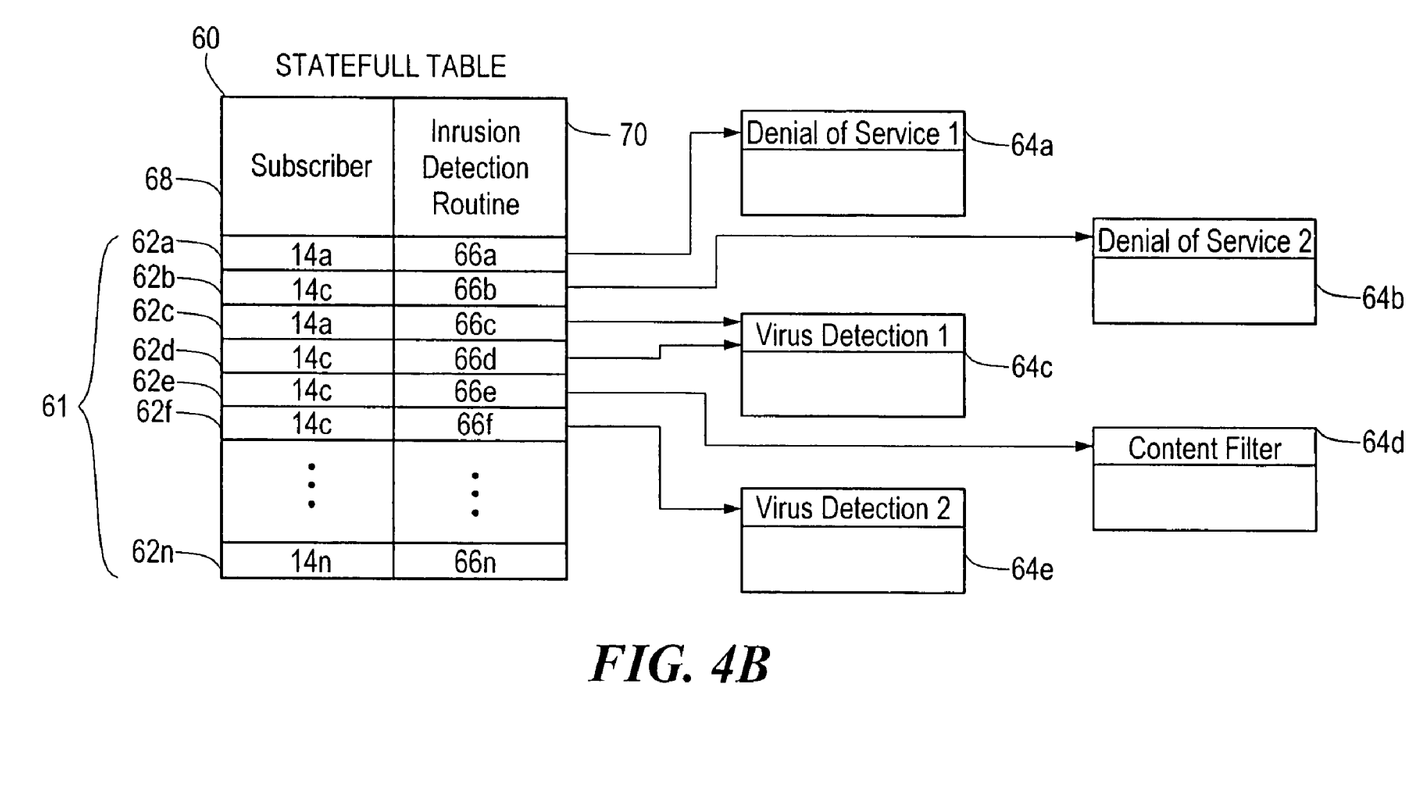
FIG. 4b shows a statefull table for state based firewall protection.

FIG. 4b shows a statefull table of firewall protection for use in conjunction with the firewall user profile described above with respect to FIG. 4a. Referring to FIG. 4b, a state oriented table of firewall protection 60 is shown. As indicated above, one of the entries in the user profile table is an intrusion detection field. A "Y" entry in the intrusion detection field indicates that the subscriber also desires statefull firewall protection as defined in the statefull firewall protection table 60. The statefull table 60 has a plurality of statefull entries 61, each containing a subscriber 68 field and an intrusion detection routine 70 entry. Each of the subscriber entries 62a-62f contains the identity of a subscriber 14n to which the entry corresponds, and can contain an arbitrary number of entries, denoted 62n. Each of the intrusion detection routines 70 contains a corresponding entry having a pointer 66a-66f to the set of rules for the particular type of firewall protection desired. Each of the pointers points to a set of rules 64n generally, as indicated by the arrows.

Continuing to refer to FIG. 4b, subscriber 14a desires protection provided by denial of service 1 rules 64a, as shown by statefull table 60 entry 62a and pointer 66a. Also, subscriber 14a desires protection by virus detection 1 64c rules, as indicated by entry 62c. Subscriber 14c desires protection by denial of service 2 64b rules, virus detection 1 64c rules concurrently with subscriber 14a, content filter 64d rules, and virus detection 2 64w rules, as shown by entries 62b, 62d, 62e, and 62f, respectively. Subscriber 14c may desire both virus protection 1 64c and virus protection 2 64e because each may protect against a different set of viruses. Similarly, as both subscribers 14a and 14c desire virus protection 1 64c, the intrusion detection routine 70 entry 66c and 66d both point the virus protection 1 64c set of rules.

In a typical embodiment, the sets of rules 64a-64e are software code routines operable to examine the information in message packets, however could be implemented in hardware or firmware or other medium. Similarly, the statefull table 60 and intrusion detection routine 70 pointer disclosed here could be implemented by alternative embodiments known to those skilled in the art. For example, the intrusion detection 44i entry (FIG. 4a) could itself be a pointer to set of intrusion detection rules 64a-64e. Further, additional sets of rules 64n could be implemented depending upon the level of complexity and the computing and memory resources available, and may be implemented by a variety of pointer, indexing, or other addressing techniques.

Figure 6:
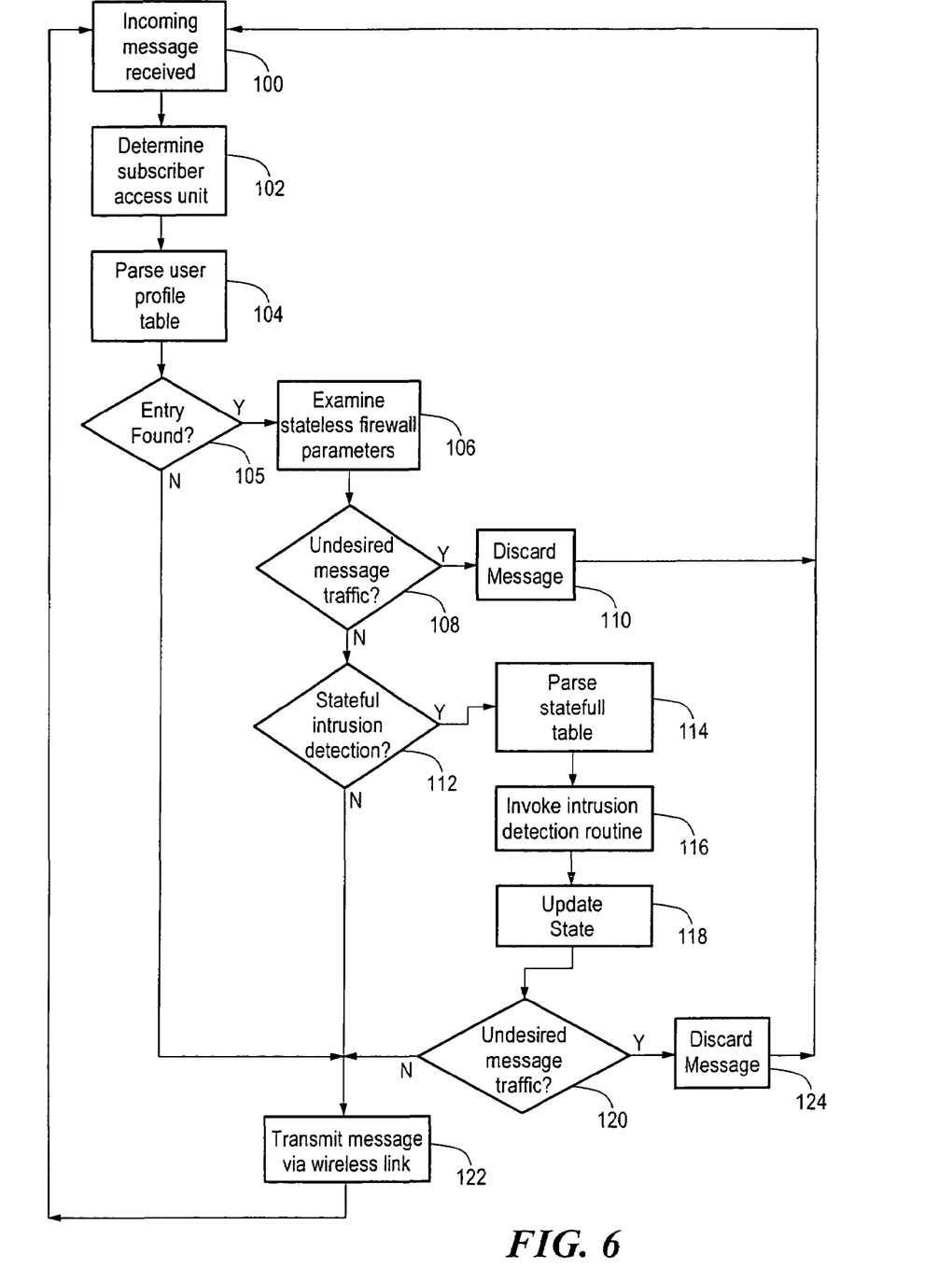
FIG. 6 shows a flowchart of firewall protection.

FIG. 6 shows a flowchart of firewall protection as defined herein. Referring to FIG. 6, an incoming message is received on a wired side of a wireless link, as depicted at step 100. A destination subscriber access unit to which the message is directed via the wireless link is determined, as shown at step 102. Prior to transmission over the wireless link, the user profile table is parsed to determine if there are any entries corresponding to the destination subscriber access unit, as disclosed at step 104. A check is performed to determine if any entries are found for this subscriber access unit, as disclosed at step 105. If no entries are found, then the message is transmitted via the wireless link, as disclosed at step 122. If there are entries corresponding to the destination subscriber access unit, the entry is parsed to examine the stateless firewall parameters for this entry, as depicted at step 106. A check is performed to determine if any of the stateless entries indicate undesired message traffic, as shown at step 108. If any of the entries indicate undesired message traffic, the message is discarded, as shown at step 110, and control reverts to step 100 to wait for the next message. Typically, undesired message traffic may also result in a message or log entry being written for operator review. If the stateless entries do not indicate undesired message traffic, then the intrusion detection entry is examined to determine if a statefull check is indicated by this entry, as shown at step 112. If a statefull check is not indicated, then the message is transmitted via the wireless link, as shown at disclosed at step 122, and control reverts to step 100 to wait for the next message to be received. If a statefull check is indicated, then the statefull table is parsed to find an entry corresponding to this subscriber, as shown at step 114. The corresponding intrusion detection routine is invoked via the pointer from the table, as depicted at step 116. The state is then updated to reflect the newly arrived packet, as shown at step 118. A check is performed to determine if this entry triggers a state indicative of undesired message traffic, as indicated at step 120. If so, than the message is discarded, as shown at step 124, and control reverts to step 100. If no undesired message traffic is indicated, then the message is transmitted over the wireless link, as depicted at step 122, and control reverts to step 100 for the next message to be received.

Those skilled in the art should readily appreciate that the programs defining the firewall application defined herein are deliverable to a subscriber access unit and to a base station processor in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for firewall protection has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method in a base station for providing protection for wireless access units using a firewall application comprising:
obtaining profile information associated with a first wireless access unit;
establishing a first firewall configuration for the first wireless access unit at the firewall application from the obtained profile information associated with the first wireless access unit;

obtaining profile information associated with a second wireless access unit; and establishing a second firewall configuration for the second wireless access unit at the firewall application from the obtained profile information associated with the second wireless access unit.

2. A method as defined in claim 1 wherein the profile information associated with the first and second wireless access units is obtained from a central repository.

3. A method as defined in claim 2 wherein the central repository is a wireless Internet facility.

4. A method as defined in claim 1 wherein each wireless access unit is associated with a unique identifier.

5. A method as defined in claim 4 wherein the unique identifier is an electronic serial number (ESN) associated with the wireless access unit.

6. A method as defined in claim 4 wherein the unique identifier is a subscriber identifier (ID) associated with wireless access unit.

7. A method as defined in claim 4 further comprising:
using a unique identifier associated with the first wireless access unit to obtain the profile information associated with the first wireless access unit.

8. A method as defined in claim 1 further comprising:
receiving a message destined for the first wireless access unit;

determining if the message is undesired based on the obtained profile information associated with the first wireless unit; and if the message is undesired, discarding the message.

9. A method as defined in claim 8 wherein the step of determining if the message is undesired further comprises:
examining stateless firewall parameters contained in the obtained profile information associated with the first wireless unit to determine if the message is undesired.

10. A method as defined in claim 8 wherein the step of determining if the message is undesired further comprises:
determining if a stateful check is indicated in the profile information obtained for the first wireless unit;

if a stateful check is indicated, updating intrusion detection state associated with the first wireless unit; and examining the updated intrusion detection state to determine if the message is undesired.

* * * * *